Nov. 29, 1938. A. DRUMMOND Re. 20,928

KEY CHECK AND RACK

Original Filed July 23, 1936 2 Sheets-Sheet 1

Arthur Drummond INVENTOR

BY Walter H. Humphrey

ATTORNEY

Nov. 29, 1938. A. DRUMMOND Re. 20,928

KEY CHECK AND RACK

Original Filed July 23, 1936 2 Sheets-Sheet 2

Arthur Drummond INVENTOR

BY

Walter H. Humphrey ATTORNEY

Reissued Nov. 29, 1938

Re. 20,928

UNITED STATES PATENT OFFICE 20,928

KEY CHECK AND RACK

Arthur Drummond, Rye, N. Y.

Original No. 2,058,963, dated October 27, 1936, Serial No. 92,088, July 23, 1936. Application for reissue October 10, 1938, Serial No. 234,332

9 Claims. (Cl. 40—19.5)

My invention relates to an identification checking and racking device for maintaining keys or other articles in orderly assembly, conveniently accessible and individually removable and replaceable, at will, without disarranging or otherwise disturbing the racked assembly.

While the invention may be applied for use with various articles, I have embodied it herein, for purposes of illustration, as a key check and rack, designed for employment where a large number of keys are in use, as in real estate offices, hotels, public and private institutions and the like.

The common practice is to provide each key with an identification tag attached thereto by an ordinary metal key ring and the key is racked by slipping the ring on one of a number of pins or pegs projecting from the wall of a room or cabinet. This method serves fairly well where only a few keys are in use but when there are a dozen or more on each pin or peg, considerable difficulty is experienced in locating a particular key and it is then necessary to remove all keys ahead of the key desired in order to get it off the peg.

There are a number of other objectionable features in the practice above described, among which may be mentioned, failure to account for keys taken from the rack or indicate the name of the person responsible as custodian. There is also the impossibility of flattening the key and its attached tag in an envelope for mailing purposes, as the ring stands at right angles to both the key and the tag and makes a bulging package, dangerous to the stamp cancelling machines of the post office.

To meet and overcome the above and other objections, I have eliminated the key ring and devised a connection between the tag and key that is flexible, flat and does not appreciably exceed the thickness of either the key or the tag. A tagged key employing this feature of improvement, when placed in an envelope for mailing, makes a perfectly flat package which may be safely passed through the stamp cancelling machines of the post office without endangering the same.

I have further eliminated the pins or pegs on which the tagged keys are hung by means of the connecting key rings, and substituted thin strips of metal, suitably positioned on the wall of a room or in a filing cabinet, to provide support for the key tags, which are formed with edge notches to engage the strips.

Thus constructed, a tagged key may be placed on or removed from any point of the rack without disturbing the other keys and the tags may be placed vertically upright thereon or pressed over at an angle, to facilitate reading the identification markings and expedite locating the key desired among the assembly on the rack.

I also provide index tags which are similarly edge-notched to engage the racks and serve to indicate key groupings, alphabetically arranged on the racks.

To account for keys taken from the racks, I provide information card carriers in the form of an edge-notched tag to which a card is removably secured bearing the name and address of the person who took the key. This card-carrying tag is substituted on the rack for the missing key and remains there until the key is returned.

Various other features of advantage will be pointed out in the detail description given below.

In the accompanying drawings I have illustrated a construction and various modifications suitable for carrying my invention into effect but do not wish to be understood as intending to limit myself to the same, as changes may be made in both the form and details without departing from the spirit and scope of the invention, as outlined in the appended claims.

In the drawings—

Figure 1:
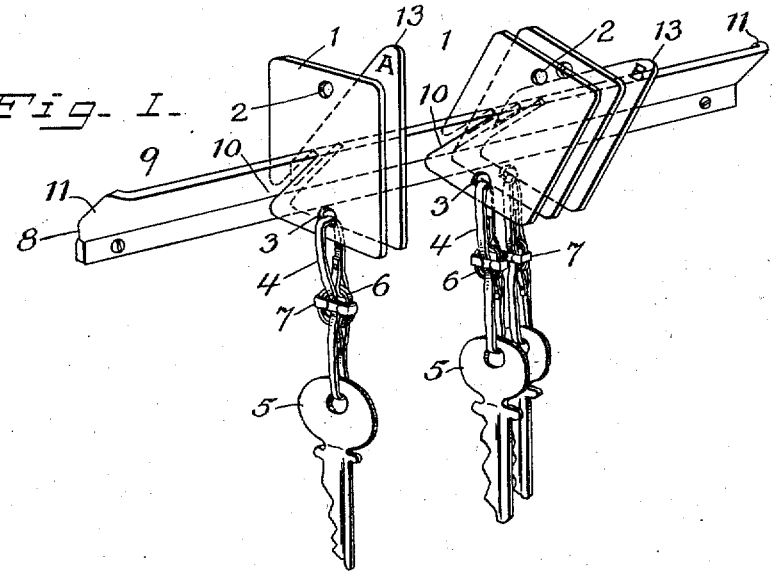
Fig. 1 is a view in perspective showing one form of wall or cabinet rack with several identification key tags and an index tag in position thereon. The tags at the left are shown vertically upright on the rack and those at the right are pressed over at an angle, to facilitate reading the identification marking.
Figure 2:
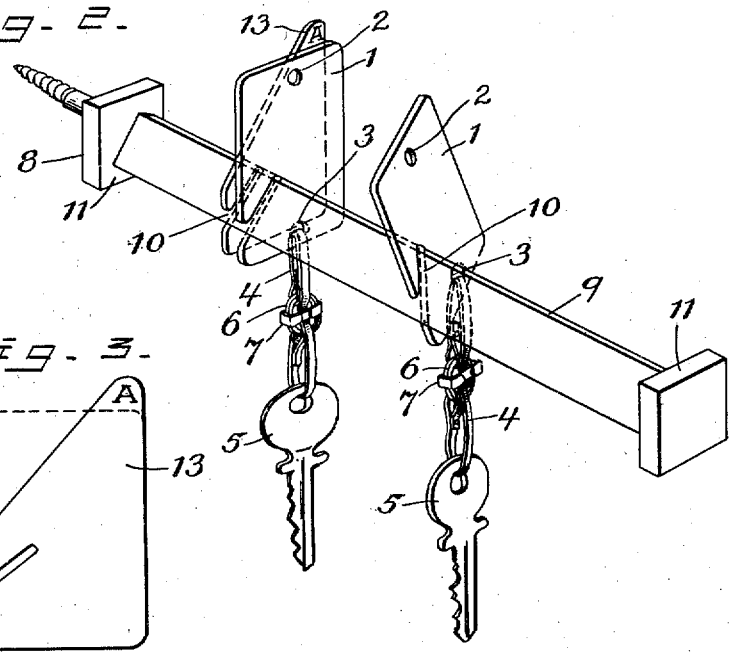
Fig. 2 is a similar view showing a modified form of rack, with key identification and index tags thereon in vertical and inclined positions, as in Fig. 1.
Figure 4:
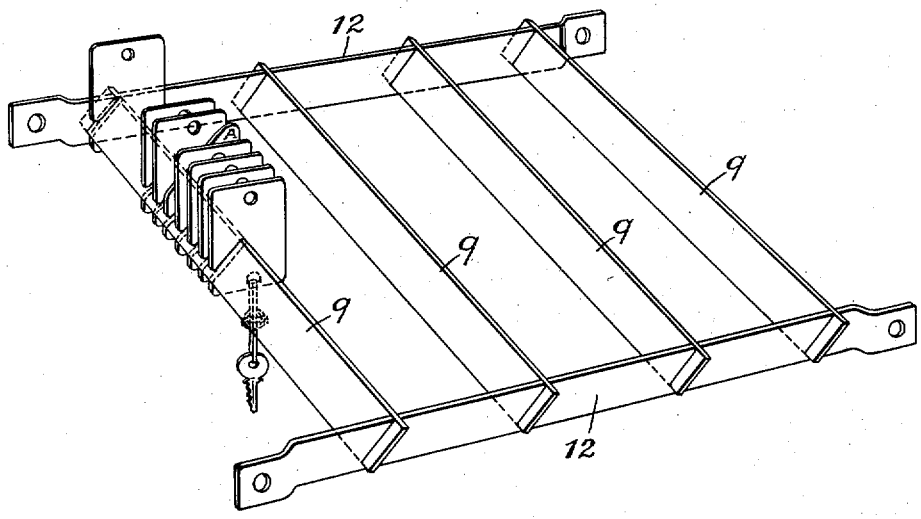
Fig. 4 shows a further modification of the rack in a form suitable for the drawer of a desk or file cabinet.
Figure 7:
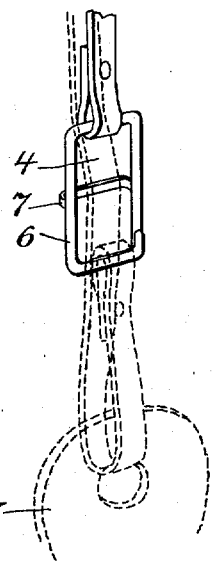
Figure 6:
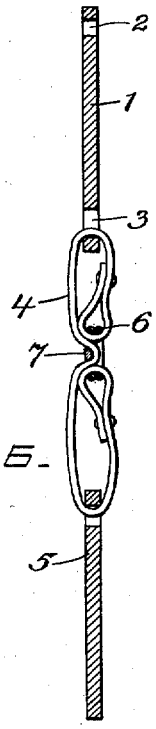

Fig. 6 is a vertical central sectional view of a key with its attached identification tag of the form shown in Figs. 1, 2 and 4, the strap connection between the key and tag being shown spread apart somewhat for clearness of illustration and Fig. 7 is a perspective view, on an enlarged scale, for clearness of illustration, showing a modification of the metal fastening employed in the connection between the key and the tag.

Referring now to the drawings, 1 indicates an identification tag containing suitable identification markings, and may be made of metal, fibre or any other suitable material. The tag is preferably square or rectangular in outline, with the corners rounded.

Two openings are formed in the tag, one near the top and the other near the bottom. The top opening 2 is provided to enable the key to be hung on a pin or nail, when the rack, to be hereinafter described, is not available. The bottom opening 3 presents a flat side, parallel with the lower edge of the tag and is provided for the insertion of a flexible strap 4 by which the tag is attached to a key 5 or other article.

The ends of the strap 4 are detachably connected by a split ring 6, forming a flexible looped connection between the tag and the key. To maintain the tag and key extended in separated relation, convenient for handling, the ring is provided with a metal cross member 7, to engage the mid section of the strap and form, in effect, two loops, one for the tag and the other for the key or other article to which the tag is attached.

The keys or other articles thus tagged, are designed to be supported in suspended relation from a suitable rack 8, several forms of which are shown in the drawings. The rack may extend parallel to the wall of a room, as in Fig. 1, or at right angles, as in Fig. 2, or transversely of the drawer of a desk or filing cabinet, as in Fig. 4.

The rack consists essentially of a horizontally extending strip of metal, presenting a bent over or inclined edge portion 9, suitable for being engaged by edge notches 10, formed in the tags.

In Fig. 1, the rack is shown formed of a strip of metal, shaped to be secured to the wall or side of a desk drawer, by screws along its lower edge and having the upper edge portion 9, bent outwardly to receive the notched tags. The ends of the outwardly extending edge portion are bent inwardly as stops 11 to prevent the tags from slipping off.

In Fig. 2, the rack is shown of "peg" form, designed to be screwed into the wall of a room or desk drawer and having the bent over or inclined edge portion 9 for engagement by the notched tags and the end stops 11, as in Fig. 1.

In Fig. 4, a multiple rack is shown, consisting of a number of bent over or inclined edge strips extending in parallel separated relation transversely of a suitable supporting frame, here shown as side strips 12, provided with openings for screws, by which the rack may be secured in a drawer of a desk or filing cabinet.

The edge notches 10 in the tags, are formed in the lower left hand side and extend diagonally upward, as shown. This construction utilizes the weight of the overhanging right hand portion of the tag, assisted by the weight of the attached key or other article, to maintain the tags vertically upright on the rack.

When a rack is filled to capacity and any difficulty is experienced in reading the identification markings on the tags, they may, by slight pressure, be moved from their vertically upright position shown at the left of Figs. 1 and 2, to an inclined position, shown at the right of these views, to expose the markings for easier reading.

Figure 3:
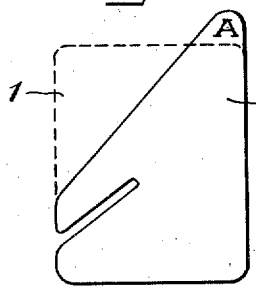
Fig. 3 shows an index tag in full lines and an identification tag in dotted lines, the index tag being made somewhat longer to expose the index marking and having its upper left hand corner portion cut away to throw the weight on the right hand side which overhangs from the rack and serves to maintain the tag in a vertically upright position.

To enable the keys to be grouped alphabetically on the racks and thus save time in locating a particular key, I provide index tags 13, shown in Figs. 1, 2 and 3. The index tags are provided with edge notches of the same form as the identification tags, for engagement with the rack and are given an increase in length sufficient to expose the index marking, as shown in the drawings. To enable the index tags to maintain themselves vertically upright on the rack, the upper left hand corner portion is cut away, to throw the weight of the body of the tag on the overhanging right hand side.

It is common practice in the real estate business, for an individual or firm to show property in charge of another individual or firm and to borrow the keys admitting them to the buildings on the property.

Figure 5:
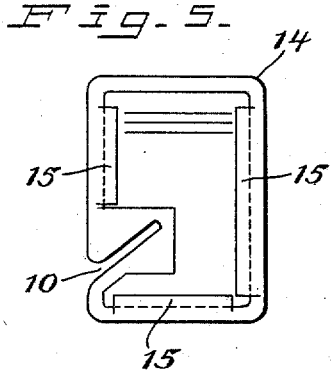
Fig. 5 shows a form of information card carrier for use on the rack to indicate the whereabouts of missing keys.

In order that the office loaning the keys may have a record of the transaction, I provide an information card carrying tag 14, such as is shown in Fig. 5. This tag is a duplicate of the identification tag above described and in addition, is suitably provided with clips 15, under which a card 16, bearing the name, address of the borrower and other data, may be slipped and held. These tags are intended to replace keys taken from the rack and to remain on the rack until such keys are returned.

In Fig. 7, I have shown on an enlarged scale, a slight modification of the split ring and cross member of the strap connection shown in Figs. 1 and 2. In the last named views, the split ring and cross member are formed as separate parts while in the modification, they are formed in one piece. Aside from this difference, they are substantially identical.

As I have indicated herein, the present application to keys, is for purposes of illustration and not limitation, as the invention may be applied, without appreciable modification, for use with many other articles, as will be evident.

As the construction, operation and many important advantages of the invention will be apparent from the foregoing, it will not be necessary to further describe the same.

Having described my invention, I claim:

1. In combination, a plurality of identification tags, means securing a tag to each article to be identified, and a support for the tags with the articles attached, said tags each being provided with an edge notch suitable for engaging the support in such relation as to permit a tag to be slipped on or off the support without requiring the removal of other tags carried by the support.

2. In combination, a plurality of identification tags, means securing a tag to each article to be identified, a support for the tags with the articles attached, said tags each being provided with an edge notch suitable for engaging the support in such relation as to permit a tag to be slipped on or off the support without requiring the removal of other tags carried by the support, and an information card carrier edge-notched to engage the support and serve as a substitute for an absent identification tag and its attached article.

3. In combination, a plurality of identification tags, means securing a tag to each article to be identified, and a support presenting an inclined edge portion adapted to receive the tags with the articles attached, said tags each being provided with an angularly disposed edge notch to engage the inclined portion of the support, being optionally positioned vertically upright or at an angle to facilitate ready reading of the identification markings on the tags.

4. In combination, a plurality of identification tags, index tags of suitable size to extend beyond the identification tags and expose index markings, means securing an identification tag to each article to be identified, and a support presenting an inclined edge portion adapted to receive both the identification tags with the articles attached and the index tags, said tags each being provided with an angularly disposed edge notch to engage the inclined portion of the support in such relation as to permit a tag to be slipped on or off the support without requiring the removal of other tags carried by the support.

5. In combination, a plurality of identification tags, index tags of greater length to extend above the identification tags and expose index markings, means securing an identification tag to each article to be identified, and a supporting rack presenting a number of inclined parallel portions adapted to receive both the identification tags with the articles attached and the index tags, said tags each being provided with an angularly disposed edge notch to engage any one of the inclined portions of the supporting rack in such relation as to permit a tag to be slipped on or off the support without requiring the removal of other tags carried by the support.

6. In combination, a plurality of identification tags, means detachably securing a tag to each article to be identified, said means comprising a strip of flexible material threaded through openings of the tag and article and having its ends and mid section detachably secured together, and a support for the tags with the articles attached, the said support and tags being so constructed as to permit any tag to be slipped on or off without requiring the removal of other tags carried by the support.

7. In combination, a plurality of identification tags, means detachably securing a tag to each article to be identified, said means comprising a strip of flexible material threaded through openings of the tag and article and having its ends looped and detachably secured together by a suitable fastening which encircles the strip about its mid section, and a support for the tags with the articles attached, the said support and tags being so constructed as to permit any tag to be slipped on or off without requiring the removal of other tags carried by the support.

8. In combination, a plurality of identification tags, means detachably securing a tag to each article to be identified, said means comprising a flat strip of flexible material threaded flat-wise through openings of the tag and article and having its ends looped and the loops connected by a split ring which encircles the strip about its mid section, and a support for the tags with the articles attached, the said support and tags being so constructed as to permit any tag to be slipped on or off without removing other tags carried by the support.

9. In combination, a plurality of identification tags each provided with an open edge notch, means detachably securing a tag to each article to be identified, said means comprising a strip of flexible material threaded through openings of the tag and article and having its ends and mid section detachably secured together, and a support suitable for engaging the notched tags in such relation as to permit any tag to be slipped on or off the same without requiring the removal of other tags carried by the support.

ARTHUR DRUMMOND.